Oct. 1, 1968

B. BOSKOVICH ET AL 3,403,874

CONTROL APPARATUS FOR AIRCRAFT HAVING FAIL-SAFE
MONITORING GYROS

Filed July 20, 1965

INVENTOR.
BORIS BOSKOVICH
JOHN C. LARSON
BY Gordon C. Reed
ATTORNEY

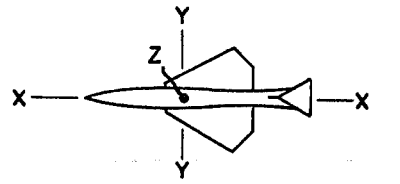
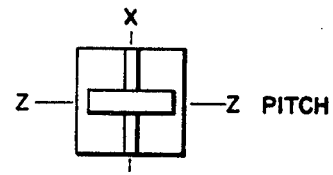
FIG. 7
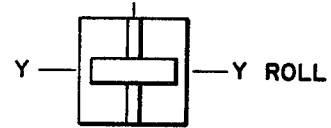
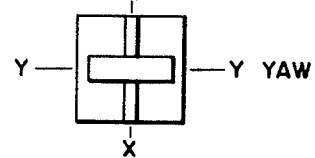
FIG. 3
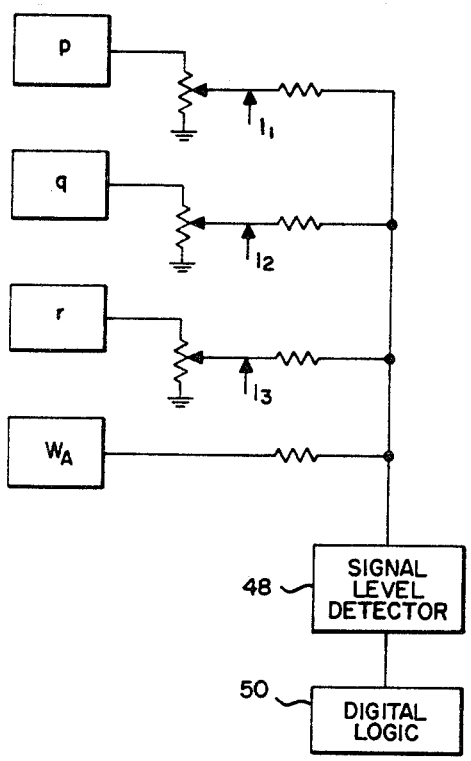

RELAY $K_1$ TO RIGHT IF VOTER LOGIC SAYS $N_Z$ FAILED
RELAY $K_2$ TO RIGHT IF VOTER LOGIC SAYS $N_Y$ FAILED

United States Patent Office 3,403,874
Patented Oct. 1, 1968

3,403,874
CONTROL APPARATUS FOR AIRCRAFT HAVING
FAIL-SAFE MONITORING GYROS
Boris Boskovich and John C. Larson, Minneapolis, Minn.,
assignors to Honeywell Inc., Minneapolis, Minn., a corporation of Delaware
Filed July 20, 1965, Ser. No. 473,400
15 Claims. (Cl. 244—77)

ABSTRACT OF THE DISCLOSURE

The disclosure pertains to a fail-safe monitoring apparatus using redundancy of condition sensing elements, and the apparatus specifically relates to techniques of arranging five sensing elements as rate gyros, for example, in an aircraft to provide three axis control about the conventional three orthogonal axes of the craft. In the arrangement of the gyros with respect to the three conventional axes, one gyro is arranged to sense primarily pitch rate, another is arranged primarily to sense the roll rate, a third is arranged to primarily sense yaw rate. The remaining two gyros each have a separate axis and each axis thereof is at an angle to the three orthogonal axes, so that the "skewed" axes on the gyros are responsive to craft movements about the three rectangular axes.

The responses of the five rate gyros to aircraft rotations about its axes are applied to a voter logic for identifying any failure in any of the three gyros associated with the rectangular axes. Upon such failure, a signal derived from the responses of the two skewed axes gyros and the two unfailed gyros associated with the remaining two rectangular axes is substituted for the signal from the failed gyro.

The voter logic controls suitable switching to effect such substitution.

Heretofore typical monitoring for three axes of an aircraft has been provided by three sensors per axes; however, in the present disclosure three axis monitoring is provided by merely arranging a total of five condition sensors.

This invention relates to flight control systems for controlling an aircraft about its three orthogonal axes wherein a stabilization augmentation system is provided for the orthogonal yaw, pitch, and roll axes of the aircraft. The invention is directed toward increasing the reliability of the three axis control system for an aircraft by means of redundancy provisions.

Heretofore with regard to redundancy provisions, a single axis control system was provided with three sensing devices sensing the same condition and by means of a majority voting arrangement, if one of such sensing devices provided an output different from the other two sensing devices, it was automatically rendered ineffective to further control the craft about the particular axis involved.

From the above it thus appears that for a three axis control system utilizing majority voting in conjunction with redundant methods, if the same concepts were applied to three axes of the aircraft it would be necessary to provide three like sensors, three for each axis (for a total of nine sensors).

It is an object of this invention to provide three axis monitoring by redundancy methods that reduce the number of redundant elements required for monitoring purposes.

It is a further object of this invention to develop a technique using a combination of orthogonally and non-orthogonally mounted sensors to provide fail-operation performance with a minimum number of sensors.

It is a further object of this invention to provide a combination of orthogonally and non-orthogonally mounted rate gyros to provide fail-operational performance of a three axis control system wherein three of the five rate gyros are mounted respectively on the three orthogonal axes of the aircraft and the remaining two rate gyros are mounted on separate axes intermediate to the orthogonal axes of the craft.

It is a further object of this invention to develop a redundancy technique to provide fail-operational performance of a three axis control system utilizing skewed sensors in conjunction with sensors mounted to sense movements with respect to orthogonal axes of the aircraft.

The above and other objects and advantages of the present invention, not enumerated above, will become evident from the following detailed description of a preferred embodiment thereof illustrated in the accompanying drawings, wherein:

FIGURE 3 is a representation of the rate sensors on the three axes of the craft;

FIGURE 7 is a block diagam of a stability augmentation system for one channel of the three axis system.

Figure 1:
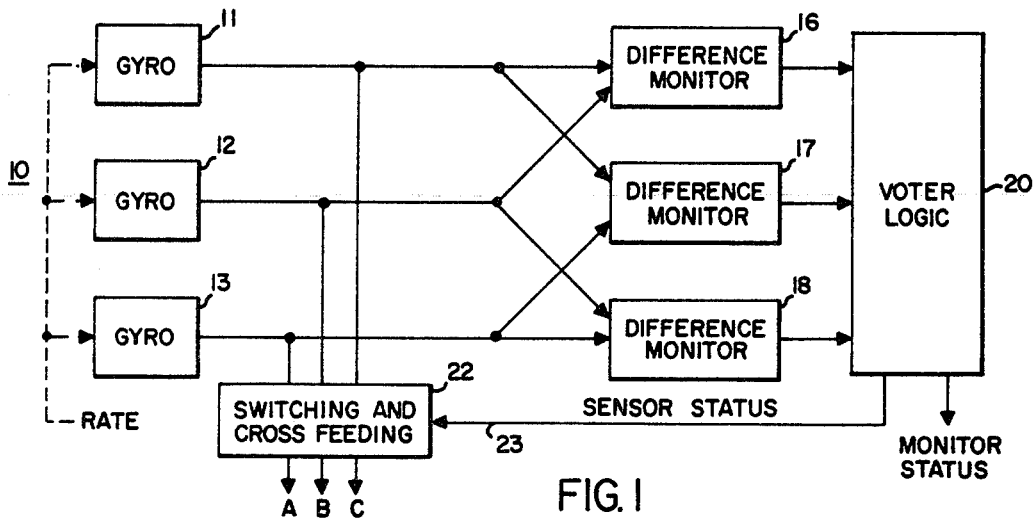
FIGURE 1 is a block diagram of a single axis system using plural sensors with majority voting.

In FIGURE 1 there is shown a triple redundant sensor, one axis redundant system with majority voting in conventional form wherein three sensors such as gyros 11, 12, and 13 sense the same condition. The output from gyro 11 is supplied to a first difference monitor 16 and to a second difference monitor 17. The output from gyro 12 is applied to the first difference monitor 16 and also to the third difference monitor 18. The output from gyro 13 is supplied to the second difference monitor 17 and to the third difference monitor 18. The outputs from the three difference monitors are applied to a voter logic 20. From inspection it will be apparent that if there is an output from difference monitors 16 and 17 but no output from difference monitor 18 that gyro 11 apparently is malfunctioning as respecting the remaining two gyros 12 and 13. Similarly, if there is no output from monitor 17 but there is an output from monitors 16 and 18, gyro 12 is malfunctioning. Through the voter logic 20 a switching and cross feeding arrangement 22 connected to logic 20 through transmitting means 23 renders the malfunctioning gyro ineffective to control the single axis stabilization system for the aircraft.

It is evident from the above that were a redundancy arrangement with majority voting provided for each of the three orthogonal axes that nine sensors corresponding with gyros 11, 12, and 13 would be required for three axis monitoring.

Figure 2:
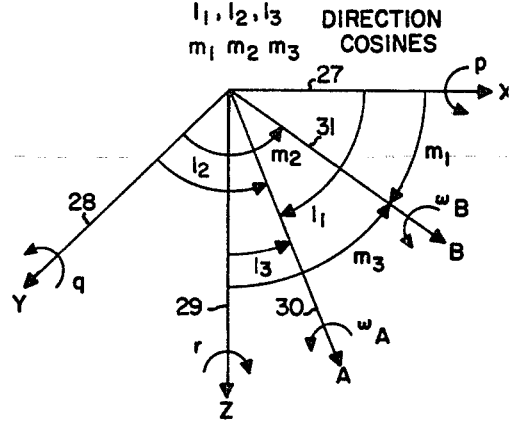
FIGURE 2 is a geometrical drawing of the three orthogonal axes of an aircraft with two intermediate skewed axes.

FIGURE 2 shows the three orthogonal axes 27, 28, and 29 for an aircraft with axis 27 corresponding with the longitudinal or X axis of the craft, axis 28 corresponding with the lateral or Y axis, and axis 29 coresponding with vertical axis or Z axis of the aircraft. The skewed gyro redundancy concept is best understood by interpreting FIGURE 2 which as stated illustrates the relative orientation of the orthogonal and non-orthogonal axes. If $l_1$, $l_2$, and $l_3$ are defined as the direction cosines from an orthogonal set X, Y, Z (to axis A) and $m_1$, $m_2$, and $m_3$ to axis B respectively, two equations relating the angular rates (omega) about the skewed axes 30, 31 to the orthogonal set are generated. From these two equations, three dependent equations may then be formed by simultaneous solutions, eliminating in turn the variables, $p$, $q$, and $r$ wherein $p$ is the angular rate or roll rate about the longitudinal axis X, $q$ is the angular rate about the Y axis or pitch rate, and $r$ is the yaw rate or angular rate about the axis Z. These 5 equations are:

(1) $l_1 p + l_2 q + l_3 r - \omega_A = 0$
(2) $m_1 p + m_2 q + m_3 r - \omega_B = 0$
(3) $m_1 \omega_A - l_1 \omega_B + (l_1 m_2 - l_2 m_1) q + (l_1 m_3 - l_3 m_1) r = 0$
(4) $m_2 \omega_A - l_2 \omega_B + (l_2 m_1 - l_1 m_2) p + (l_2 m_3 - l_3 m_2) r = 0$
(5) $m_3 \omega_A - l_3 \omega_B + (l_3 m_1 - l_1 m_3) p + (l_3 m_2 - l_2 m_3) q = 0$ If a "failed state" of a variable is designated "0" and the "normal state" is designated "1," fault and isolation intelligence is derived by interpreting the state equations of the above relationships:

| Gyro | | | | | Equation | | | | |
|---|---|---|---|---|---|---|---|---|---|
| p | q | r | $\omega_A$ | $\omega_B$ | (1) | (2) | (3) | (4) | (5) |
| 1 | 1 | 1 | 1 | 1 | 1 | 1 | 1 | 1 | 1 |
| 0 | 1 | 1 | 1 | 1 | 0 | 0 | 1 | 0 | 0 |
| 1 | 0 | 1 | 1 | 1 | 0 | 0 | 0 | 1 | 0 |
| 1 | 1 | 0 | 1 | 1 | 0 | 0 | 0 | 0 | 1 |
| 1 | 1 | 1 | 0 | 1 | 0 | 1 | 0 | 0 | 0 |
| 1 | 1 | 1 | 1 | 0 | 1 | 0 | 0 | 0 | 0 |
| 2nd Failure Combinations | | | | | 0 | 0 | 0 | 0 | 0 |

For any second failure, all equations are in the "0" (failed) state. Equations 1–5 are applied to FIGURE 4. It will be realized that the coefficients of the variables $p$, $q$, $r$, $\omega_A$, $\omega_B$ are fixed quantities or constants determined from fixed values of cosines. Thus these coefficients are fixed gains readily applicable to a control signal, as in Equations 1–5.

In the event either $p$, $q$, or $r$ rate signals which are normally the sole control signals used by the autopilot are faulty, an alternative rate signal ($p'$, $q'$, $r'$) can be derived readily, since their computation is straight forward, by the computer using equations:

$$p' = \frac{\omega_A - l_2 q - l_3 r}{l_1} \text{ or } p' = \frac{\omega_B - m_2 q - m_3 r}{m_1}$$

$$q' = \frac{\omega_A - l_1 p - l_3 r}{l_2} \text{ or } q' = \frac{\omega_B - m_1 p - m_3 r}{m_2}$$

$$r' = \frac{\omega_A - l_1 p - l_2 q}{l_3} \text{ or } r' = \frac{\omega_B - m_1 p - m_2 q}{m_3}$$

Figure 8:
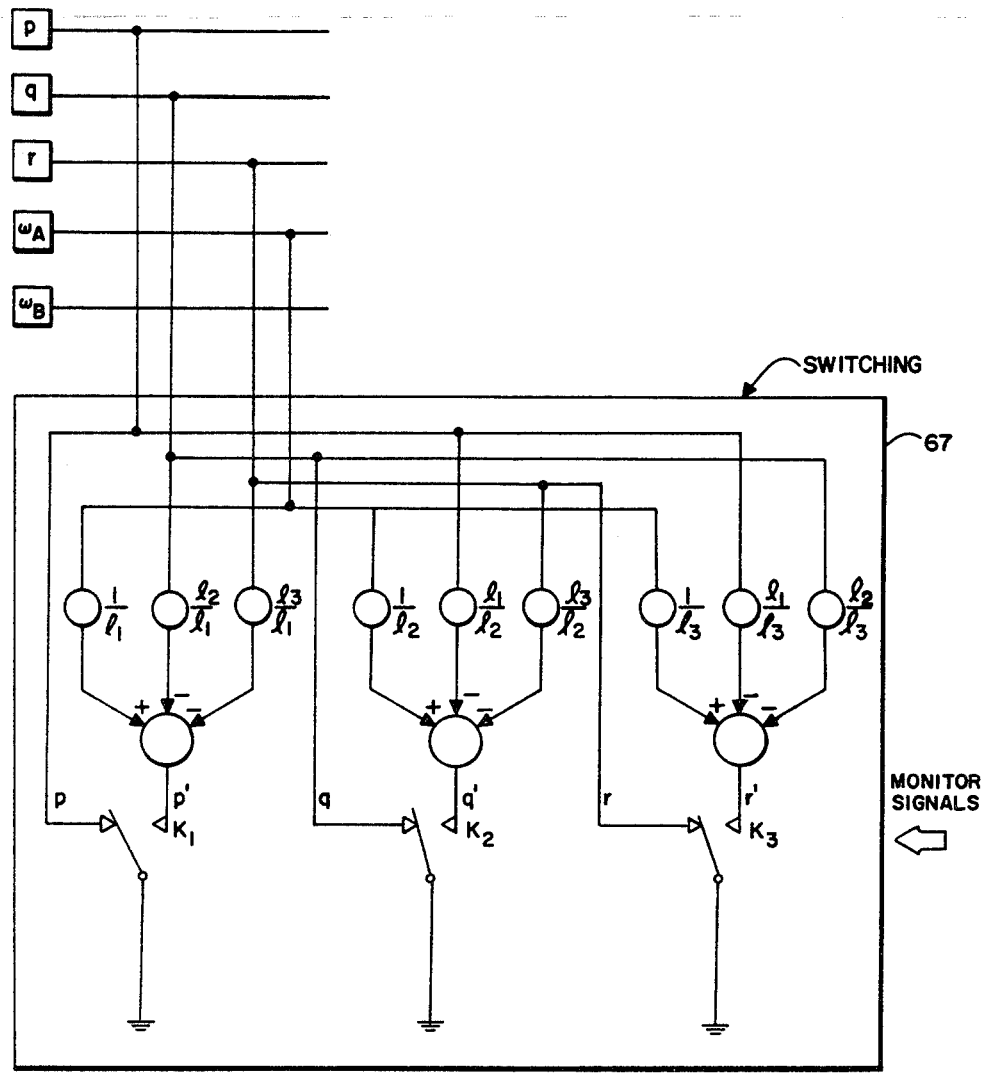
FIGURE 8 is a layout of a switching arrangement for providing a computed rate signal about an axis.

From the above expressions, there are alternative methods for computing $p'$. The arrangement in FIGURE 8 computes $p'$ using the variable quantities $\omega_A$, $q$, $r$. An alternative arrangement may be readily provided similar to FIGURE 8 for providing $p'$ using the variables $\omega_B$, $q$, $r$. Because of the alternative method of determining $p'$ the inputs to switching arrangement 67, FIGURE 4 from gyros 43 and 44 are shown dotted whereby implying either $\omega_A$ or $\omega_B$ may be used but both are not used simultaneously.

Figure 6:
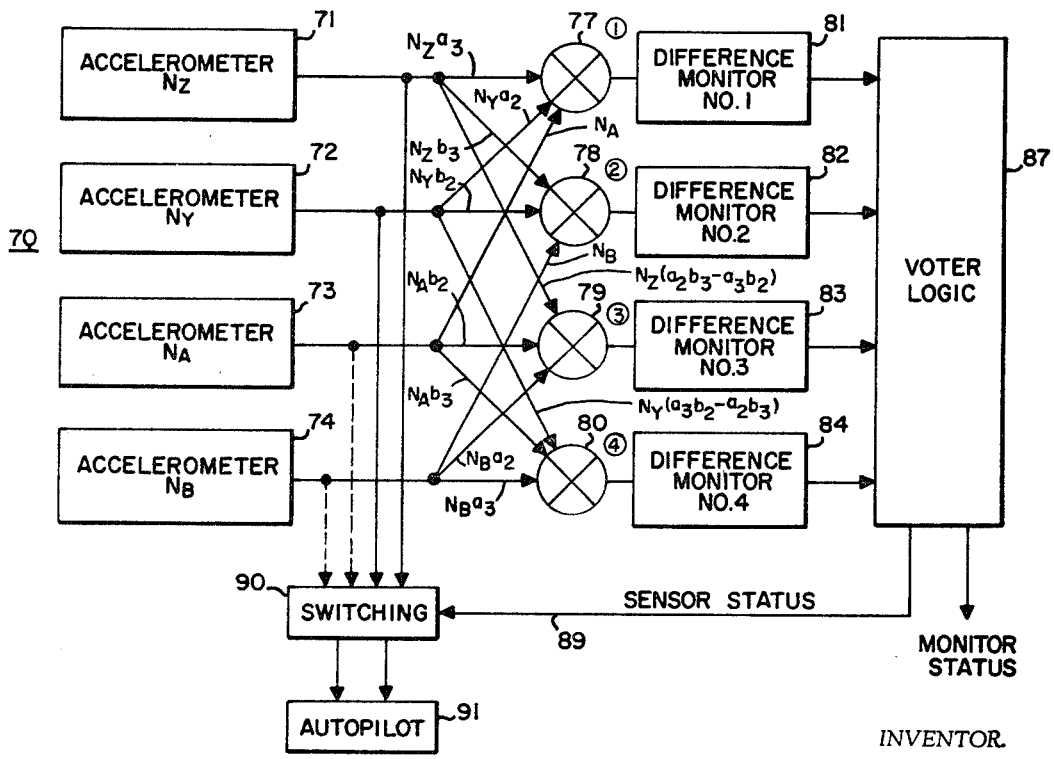
FIGURE 6 is a redundancy monitoring arrangement based on the concepts of FIGURE 5.

The accelerometers can be treated in the same manner. FIGURE 6 illustrates the relative orientation of the four accelerometer set. The direction cosines with respect to axis A and B from x, y, and z are $a_1$, $a_2$, $a_3$ and $b_1$, $b_2$, and $b_3$ respectively. The necessary equations are:

(1) $N_A - N_y a_2 - N_z a_3 = 0$
(2) $N_B - N_y b_2 - N_z b_3 = 0$
(3) $b_2 N_A - a_2 N_B + (a_2 b_3 - a_3 b_2) N_z = 0$
(4) $b_3 N_A - a_3 N_B + (a_3 b_2 - a_2 b_3) N_y = 0$

Note here that $a_1$ and $b_1$ are zero for the case shown in FIGURE 6 implying that four accelerometers are in the YZ plane at right angles to axis X, and therefore they do not appear in the subsequent equations.

It will be realized that the coefficients of the variables $N_A$, $N_B$, $N_Z$, $N_Y$ are fixed quantities or constants determined from fixed values of cosines. Thus, these coefficients are fixed gains readily applicable to a control signal, as in Equations 1–4 above.

Interpreting these equations for failure intelligence, we obtain:

| Accelerometer | | | | Equation | | | |
|---|---|---|---|---|---|---|---|
| $N_E$ | $N_B$ | $N_y$ | $N_z$ | (1) | (2) | (3) | (4) |
| 1 | 1 | 1 | 1 | 1 | 1 | 1 | 1 |
| 0 | 1 | 1 | 1 | 0 | 1 | 0 | 0 |
| 1 | 0 | 1 | 1 | 1 | 0 | 0 | 0 |
| 1 | 1 | 0 | 1 | 0 | 0 | 1 | 0 |
| 1 | 1 | 1 | 0 | 0 | 0 | 0 | 1 |
| 2nd Failure Combinations | | | | 0 | 0 | 0 | 0 |

For any second failure all equations are again in the "0" failed state.

The derived variables are of the form:

$$N'_z = \frac{N_A - N_y a_2}{a_3} \text{ or } N'_z = \frac{N_B - N_y b_2}{b_3}$$

$$N'_y = \frac{N_A - N_z a_3}{a_2} \text{ or } N'_y = \frac{N_B - N_z b_3}{b_2}$$

Figure 9:
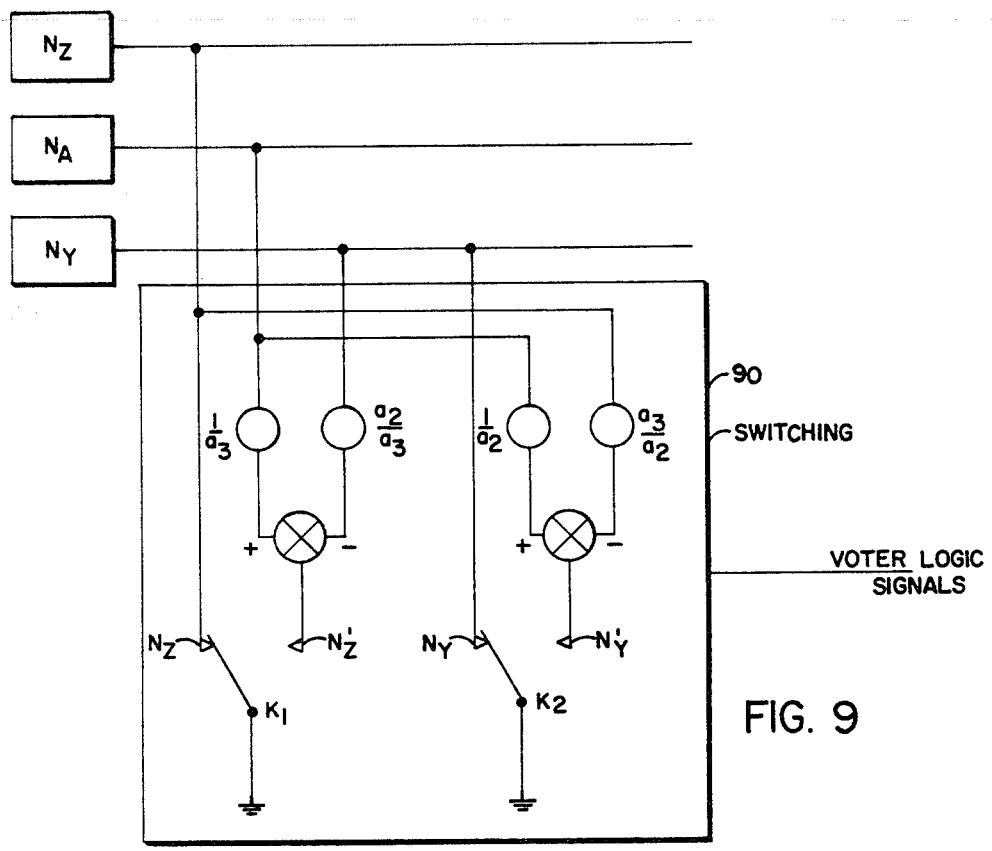
FIGURE 9 is a layout of a switching arrangement for providing a computed acceleration signal about an axis.

From the above expressions, there are alternative methods for computing $N'_z$. The arrangement in FIGURE 9 computes $N'_z$ using the variable quantities $N_A$, $N_Y$. An alternative arrangement may be readily provided similar to FIGURE 9 for providing $N'_z$ using the variables $N_B$ and $N_Y$. Because of the alternative method of determining $N'_z$, the inputs to switching arrangement 90, FIGURE 6 from accelerometers $N_A$ and $N_B$ are shown dotted thereby implying either $N_A$ or $N_B$ may be used but both are not used simultaneously.

FIGURE 2 shows the arrangement for gyro redundancy. In the gyro redundancy technique, there is a rate gyroscope mounted on each of the orthogonal axes of the craft and two other rate gyros mounted on the skewed axes 30, 31 of FIGURE 2.

The arrangement of the rate gyroscopes which are of the two degree of freedom type is shown in FIGURE 3. These gyros are of the type that have a spin axis, an input axis, and an output axis with the three axes mutually perpendicular with the extent of turn or rotation about the output axis being dependent upon the rate of turn applied to the input axis. The yaw rate gyro 42 which has the craft Z axis as its input axis has rotor spin axis in the direction of the craft X axis or longitudinal axis of the craft. The roll rate gyroscope 41 which senses angular rate about the X axis has its rotor spin axis in the direction of the Z axis or vertical axis of the craft and its output axis in the direction of the Y axis of the craft. The pitch rate gyro 40 which sense the angular rate about the craft Y axis has its rotor spin axis in the direction of the X axis and its output axis in the direction of the Z axis of the craft. The yaw and pitch rate gyroscopes with their rotor spin axes along the craft X axis are so arranged as to have very little coupling effect due to rate of roll of the craft. The gyroscopes are similarly arranged.

Figure 4:
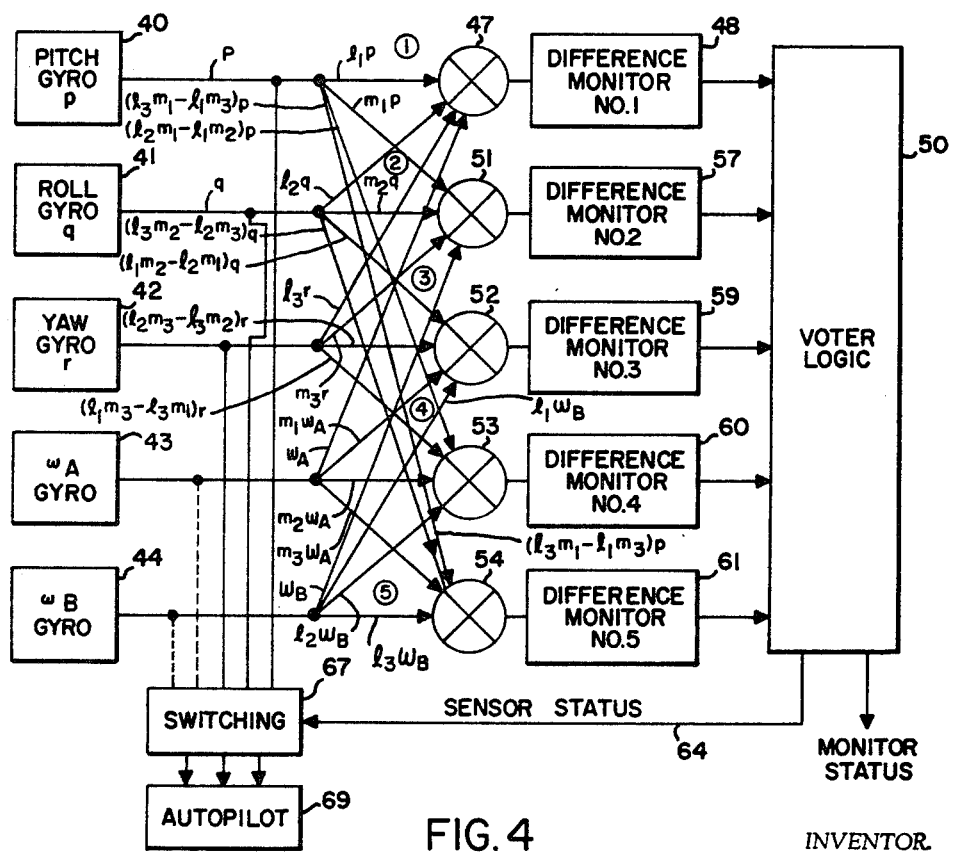
FIGURE 4 shows the voting arrangement controlled by the three orthogonally mounted sensors and two skewed axes mounted sensors.
Figure 5:
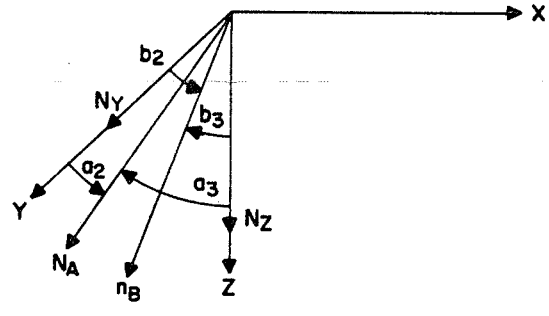
FIGURE 5 shows two axes of the aircraft along with two additionally skewed axes.

FIGURE 5 shows the monitoring arrangement based on the five equations involving pitch rate, yaw rate, roll rate, as well as $\omega_A$ and $\omega_B$. In FIGURE 4 the pitch rate gyro 40, the roll rate gyro 41, the yaw rate gyro 42, the skewed rate gyro 43, and the second skewed rate gyro 44 supply signals such as electrical signals. Based on Equation 1 and with the proper gains applied thereto as indicated by Equation 1 the outputs from gyros 40, 41, 42, and 43 are applied through a summing arrangement 47 to a difference monitor 1 in block 48. Thus, for example the pitch rate output from gyro 40 is modified by the gain $l_1$, and the roll rates and yaw rates are correspondingly modified by their proper gains.

Also, in accordance with Equation 2 the pitch rate, roll rate, yaw rate, and rate about skewed axis 31 is applied to a second summing arrangement 51 and through a difference monitor 57 to voter logic 50. Similarly, summing arrangements 51, 52, 53, 54, have their corresponding difference monitors 57, 59, 60, and 61 connected to voter logic 50 which through transmission means 64 controls the computer switching arrangement 67 for the three axis automatic pilot 69.

FIGURE 5 shows the orthogonal-non-orthogonal technique of redundancy applied to an arrangement utilizing accelerometers for sensing devices. In FIGURE 5 the three orthogonal axes X, Y and Z correspond with the longitudinal, lateral, and vertical axes of the aircraft. Intermediate to the Y and Z axes but in the plane defined by these axes are additional axes $N_A$ and $N_B$. On the Y, Z, $N_A$ and $N_B$ axes are linear accelerometers sensing acceleration along its particular axis. Thus, the accelerometer on the Y axis senses acceleration along the lateral axis whereas the accelerometer on the Z axis senses normal acceleration or acceleration along the Z axis. The remaining two linear accelerometers would sense accelerations along the $N_A$ and $N_B$ axes.

FIGURE 6 shows a redundant system 70 based on linear acceleration sensors for controlling an autopilot which in turn controls the aircraft with respect to longitudinal and normal accelerations thereon. The control of longitudinal and normal accelerations may be obtained by varying the thrust applied to the aircraft or by controlling its elevator surface.

In the redundancy arrangement 70, a Z axis accelerometer 71, a Y axis accelerometer 72, an $N_A$ axis accelerometer 73, and an $N_B$ linear accelerometer 74 have their outputs supplied respectively to summing arrangements 77, 78, 79, 80. These four summing arrangements are based on the four equations involving accelerations along the aircraft axes. The summing arrangements 77, 78, 79, and 80 in turn control the difference monitors 81, 82, 83, and 84 which have their output supplied to a voter logic 87. The voter logic 87 through transmission means 89 controls a switching arrangement 90 to determine the two acceleration inputs to autopilot 91 for control of the aircraft. The operation is such that in case of failure of the Z axis accelerometer, a substitute $N'_z$ is a derived acceleration signal based on accelerations along axis $N_A$ and acceleration along the Y axis as shown above.

Although a particular embodiment of the invention has been described in detail herein, it is evident that many variations may be devised within the spirit and scope thereof and the following claims are intended to include such variations.

We claim:

1. In apparatus for navigating a dirigible craft, craft orthogonal and non-orthogonal axes mounted sensors, each sensor sensing a similar flight condition with respect to its associated axis and providing a signal in accordance with the change in the condition; means whereby the craft may be controlled in accordance with the sensor provided signals from the sensors on the orthogonal axes of the craft; and means responsive to a failure in one of said orthogonal axis sensors substituting a derived signal based on the response of another orthogonal axis sensor, the angles between a non-orthogonal axis and the orthogonal axes and the response of a sensor on a non-orthogonal axis.

2. In apparatus for navigating a dirigible craft, such as an aircraft, having orthogonal and non-orthogonal axes, a sensor mounted on the craft with respect to each said axes sensing a flight condition with respect to its associated axis and providing a signal in accordance with said condition, means whereby the craft may be controlled to control the conditions along the orthogonal axes in accordance with the sensor provided signals from the sensors on the orthogonal axes, and means responsive to a failure in one of said orthogonal axis sensors substituting a derived signal based on the response of at least one orthogonal axis sensor, and the response of a sensor on a non-orthogonal axis and the angles between the non-orthogonal axis and two orthogonal axes.

3. In apparatus for controlling an aircraft having a plurality of orthogonal axes corresponding with the orthogonal axes of the craft and a plurality of skewed axes intermediate the orthogonal axes of the craft, a similar sensor associated with each axis and sensing a change in aircraft condition with respect to such axis, means obtaining outputs from the plurality of orthogonal axis sensors for controlling the craft, logic means controlled by the signals from the sensors on all of said axes, and switching means controlled by the logic means upon failure in one of said orthogonal axis sensors substituting a derived signal based on the response of at least one orthogonal axis sensor, the response of a sensor on a skewed axis and the angles between the skewed axis having the sensor involved in the derived signal and two orthogonal axes.

4. The apparatus of claim 3 wherein the sensors on all of the axes are rate gyros sensing angular rate about the associated axis.

5. The apparatus of claim 3 wherein the sensors are accelerometers sensing linear acceleration of the craft in the direction of the associated axis.

6. Control apparatus for an aircraft comprising: a plurality of automatic condition stabilizing units, one unit associated with one orthogonal axis of the aircraft and the remainder of the plurality of units individually associated with another orthogonal axis of the craft, each unit having a sensor sensing the condition to be stabilized with respect to its associated axis, a plurality of similar sensors associated with skewed axes of the craft sensing the condition associated with its axis, means interconnecting all of said sensing units for sensing a failure of one of said sensing units, and further means controlled by said means upon failure of one of the orthogonal axis sensors substituting a derived signal obtained at least in part from one of the skewed axis sensors.

7. Control apparatus for an aircraft comprising: a plurality of automatic condition stabilizing units, one unit associated with the X axis of the craft, another associated with the Y axis of the craft and a third associated with the Z axis of the craft, each unit having a sensor sensing the condition to be stabilized with respect to its associated axis, a plurality of similar sensors for a plurality of skewed axes of the craft sensing the condition associated with its axis, a plurality of difference monitors controlled by all of said sensors, a voter logic controlled by the difference monitors, and switching means responsive to the voter logic and on failure of one of the sensors associated with the X, Y, or Z axis substituting for the signal from the failed sensing device a derived signal based in part upon the sensor associated with a skewed axis.

8. The apparatus of claim 7 wherein the sensors detect angular rate about the associated axes and the units tend to stabilize angular rate about the craft orthogonal axes.

9. The apparatus of claim 7 wherein the sensors are rate gyros sensing angular rates about the associated axes and the units stabilize angular rates about a plurality of orthogonal axes of the craft.

10. Control apparatus for an aircraft comprising two automatic stabilization units one unit including first means providing a signal indicating the rate and direction of turn of the aircraft about one orthogonal axis; second means for providing a signal indicating the rate and direction of turn of the aircraft about a second orthogonal axis; means for supplying a signal indicating rate and direction of turn of the aircraft about its third orthogonal axis, fourth means for supplying a signal indicating the rate and direction of turn of the aircraft about a first skewed axis intermediate said orthogonal axes; fifth means for providing a signal indicating the rate and direction of turn of the aircraft about a second skewed axis; means controlled by the signals from all of the signal providing means; and further means controlled by the last named means upon failure of the signal supplying means in the one unit providing a substitute signal supplying means derived from the supplying means from two other orthogonal axes, the supplying means from at least one of said skewed axes supply means and the angles between the skewed axis and two orthogonal axes.

11. In an aircraft having a plurality of conventional orthogonal axes and a plurality of skewed axes intermediate to the orthogonal axes, a plurality of sensing devices equal to the number of axes whereby a sensor is individual to each axis; voter means responsive to the signals from all of the sensors, and the angles between each skewed axis and the orthogonal axes and further means controlled by the voter means supplying a derived signal corresponding to that from an orthogonal axis sensor, but obtained jointly from at least one other orthogonal axis sensor, a skewed sensor and the angles between the axis of the skewed sensor and the orthogonal axes.

12. In an axis system having three respectively orthogonal axes and a plurality of skewed axes intermediate the orthogonal axes, a plurality of sensing devices equal to the number of axes to provide an individual sensor for each axis indicating an angular change with respect to its associated axis; and means responsive to the signals from all of the sensors and the angles between each skewed axis and the orthogonal axis and supplying a derived signal corresponding to that from an orthogonal axis sensor but obtained from at least two other orthogonal axis sensors, a skewed axis sensor and the angles between the axis related to the skewed sensor and two orthogonal axes.

13. In control apparatus for an aircraft having a plurality of conventional orthogonal X, Y, and Z axes and a plurality of redundant or skewed axes intermediate the orthogonal axes, a plurality of sensing devices equal to the number of axes to provide a sensor individual to each axis to sense the same condition associated with craft movement with respect to its axis; and further means controlled by all of said sensors supplying a derived signal corresponding to that from a faulty orthogonal axis sensor but obtained from at least two other orthogonal axis sensors, a skewed axis sensor and the angles between the skewed axis and that of the one other orthogonal axis sensor and that of the faulty orthogonal axis sensor.

14. In multiple axis control apparatus for an aircraft, said aircraft having conventional X, Y, and Z orthogonal axes and a plurality of skewed or redundant axes extending from the corresponding origin of the axes and intermediate the orthogonal axes, monitoring means for said control apparatus for substituting in the control for a faulty sensor associated with an orthogonal axis a control comprising another orthogonal axis sensor, a skewed axis sensor and the angles between the skewed axis and the other orthogonal axis and between the skewed axis and axis of the faulty sensor.

15. The apparatus of claim 14 wherein the monitoring means includes a voter means responsive to the sensors of all of the axes and effects such substitution upon failure of the sensor associated with the involved orthogonal axes.

References Cited
UNITED STATES PATENTS 3,932,467    4/1960    Scorgie _____ 244—77
3,078,042    2/1963    Grado _____ 244—3.2 X
3,281,582    10/1966    Fischer et al. _____ 33—226

FERGUS S. MIDDLETON, *Primary Examiner.*